United States Patent
Galvan et al.

(10) Patent No.: US 10,221,261 B2
(45) Date of Patent: Mar. 5, 2019

(54) PROCESS FOR THE PREPARATION OF HIGH PURITY PROPYLENE POLYMERS

(71) Applicant: Basell Poliolefine Italia S.r.l., Milan (IT)

(72) Inventors: Monica Galvan, Ferrara (IT); Roberto Pantaleoni, Ferrara (IT); Ofelia Fusco, Ferrara (IT); Benedetta Gaddi, Ferrara (IT); Andreas Neumann, Ferrara (IT); Antonio Mazzucco, Ferrara (IT); Gianni Collina, Ferrara (IT); Gabriella Sartori, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 143 days.

(21) Appl. No.: 14/346,648

(22) PCT Filed: Sep. 17, 2012

(86) PCT No.: PCT/EP2012/068195
§ 371 (c)(1),
(2) Date: Mar. 21, 2014

(87) PCT Pub. No.: WO2013/041470
PCT Pub. Date: Mar. 28, 2013

(65) Prior Publication Data
US 2014/0235802 A1    Aug. 21, 2014

Related U.S. Application Data

(60) Provisional application No. 61/538,474, filed on Sep. 23, 2011.

(30) Foreign Application Priority Data

Sep. 23, 2011 (EP) .................................. 11182478

(51) Int. Cl.
| | |
|---|---|
| *C08F 210/06* | (2006.01) |
| *C08F 10/06* | (2006.01) |
| *C08J 5/18* | (2006.01) |
| *B01J 31/02* | (2006.01) |

(52) U.S. Cl.
CPC ............... *C08F 10/06* (2013.01); *C08J 5/18* (2013.01); *B01J 31/0204* (2013.01); *B01J 31/0209* (2013.01); *C08J 2323/14* (2013.01)

(58) Field of Classification Search
CPC ... C08F 210/06; B01J 31/0204; B01J 31/0209
USPC .......................................................... 526/351
See application file for complete search history.

(56) References Cited

U.S. PATENT DOCUMENTS

| | | | | |
|---|---|---|---|---|
| 4,617,284 | A | * 10/1986 | Matsuura ................ | C08F 10/00 502/104 |
| 5,557,025 | A | * 9/1996 | Noristi et al. ................ | 585/522 |
| 8,680,222 | B2 | * 3/2014 | Standaert ................ | C08F 10/06 502/125 |
| 9,034,784 | B2 | 5/2015 | Standaert et al. | |
| 9,593,171 | B2 | * 3/2017 | Guidotti .................. | C08F 10/06 |
| 2009/0312507 | A1 | * 12/2009 | Standaert et al. ......... | 526/125.8 |
| 2010/0069580 | A1 | * 3/2010 | Standaert ................ | C08F 10/06 526/64 |

FOREIGN PATENT DOCUMENTS

| | | | |
|---|---|---|---|
| CN | 101472963 A | 7/2009 | |
| EP | 1 849 807 A1 | * 10/2007 | ............ C08F 210/06 |
| EP | 1849807 A1 | * 10/2007 | |
| EP | 1 857 476 A1 | * 11/2007 | .............. C08F 10/06 |
| WO | WO 2007/147865 A2 | * 12/2007 | ............ C08F 210/06 |
| WO | WO2009/077464 A1 | 6/2009 | |
| WO | WO2009/077467 A1 | 6/2009 | |
| WO | WO2011/061134 A1 | 5/2011 | |

OTHER PUBLICATIONS

PCT International Search Report & Written Opinion dated Oct. 22, 2012, for PCT/EP2012/068195.

* cited by examiner

*Primary Examiner* — Rip A Lee

(57) ABSTRACT

A process for the preparation of high purity propylene polymers carried out in the presence of a catalyst comprising the product obtained by contacting:
(a) a solid catalyst component comprising Mg, Ti and at least a first internal electron donor compound (1ID) selected among the succinates and a second internal electron donor compound (2ID) selected among the 1,3-diethers, wherein the molar ratio of first internal donor over second internal donor 1ID:2ID is comprised between 4:6 and 9:1, with
(b) an organo-aluminum compound, and optionally with
(c) an external electron donor compound,
said process being carried out at a temperature equal or higher than 78° C. and by employing a molar ratio of organo-aluminum compound over solid catalyst component (b):(a) of lower than 5.

11 Claims, No Drawings

PROCESS FOR THE PREPARATION OF HIGH PURITY PROPYLENE POLYMERS

This application is the U.S. National Phase of PCT International Application PCT/EP2012/068195, filed Sep. 17, 2012, claim priority of European Patent Application No. 11182478.5, filed Sep. 23, 2011, and the benefit under 35 U.S.C. 119(e) of U.S. Provisional Application No. 61/538,474 filed Sep. 23, 2011, the contents of which are incorporated herein by reference in their entirety.

FIELD OF THE INVENTION

The present invention relates to a process for the preparation of high purity propylene (co)polymers, to the polymers thus obtainable and to their use for the manufacture of films useful for particular utilizations

BACKGROUND OF THE INVENTION

With the term "high purity propylene (co)polymers" are meant those propylene (co)polymers having a low amount of catalyst residues, also known as "low ash (co)polymers". For those polymers the total amount of ashes, including Ti, Mg, Cl and Al, is generally lower than 50 ppm.

Propylene polymers with high purity are generally used for film applications and in particular for the production of films for dielectric capacitors. In order to be used for such application the polymers also need to show a medium-broad molecular weight distribution and relatively high cristallinity.

Another field of application for high purity propylene polymers is that of very thin films (around 10 micron) for print lamination, cigarette packing.

As most of the catalysts industrially used are not able to generate polymers with such a low amount of catalyst residues, the propylene polymers intended for the above-indicated applications need to be purified with deashing treatments which, however, make the entire process much more complicated from an operational point of view.

WO2009/077464 and WO2009/077467, for example, describe the preparation of propylene polymers having low ash content carried out in the presence of a catalyst component based, respectively, on diethers and on succinates as internal donors. Those processes are characterized by the use of low Al/Ti molar ratio and the polymers obtained, despite showing a low final content of Al, contain an amount of Cl and Mg that is too high for the intended applications.

It is therefore still felt the need of a process for the production of high purity propylene polymers having a medium-broad molecular weight distribution, high cristallinity and low content of ashes, particularly in terms of Mg and Cl.

The applicant has found a process that can fulfill those needs, by combining the use of a solid catalyst component containing a specific combination of internal donors with the use of a specific amount of aluminum alkyl and with the adoption of a specific temperature range.

SUMMARY OF THE INVENTION

Hence, it is an object of the present invention a process for the preparation of high purity propylene (co)polymers comprising (co)polymerizing propylene in the presence of a catalyst system comprising the product obtained by contacting:

(a) a solid catalyst component comprising Mg, Ti and at least a first internal electron donor compound (1ID) selected among the succinates and a second internal electron donor compound (2ID) selected among the 1,3-diethers, wherein the molar ratio of first internal donor over second internal donor 1ID:2ID is comprised between 4:6 and 9:1, with (b) an organo-aluminium compound, and optionally with (c) an external electron donor compound, said process being carried out at a temperature equal or higher than 78° C., preferably comprised between 78° C. and 90° C., and by employing a weight ratio of organo-aluminum compound over propylene lower than 0.020, preferably comprised between 0.020 and 0.005 Kg/tonn.

DETAILED DESCRIPTION OF THE INVENTION

A preferred class of succinates for use as internal electron donor compound 1ID is that of the following formula (I):

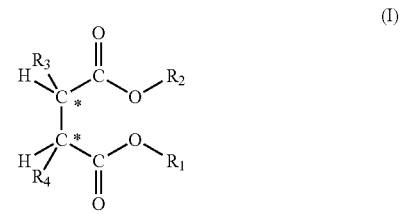

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, C3-C20 cycloalkyl, C5-C20 aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S)

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

Particularly preferred are the compounds in which the $R_3$ and/or $R_4$ radicals are secondary alkyls like isopropyl, sec-butyl, 2-pentyl, 3-pentyl or cycloakyls like cyclohexyl, cyclopentyl, cyclohexylmethyl.

Examples of the above-mentioned compounds are the (S,R) (S,R) forms pure or in mixture, optionally in racemic form, of diethyl 2,3-bis(trimethylsilyl)succinate, diethyl 2,3-bis(2-ethylbutyl) succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the 1,3-diethers mentioned above, particularly preferred are the compounds of formula (II):

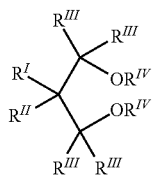

(II)

wherein $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl) 1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, particularly preferred are the 1,3-diethers of formula (III):

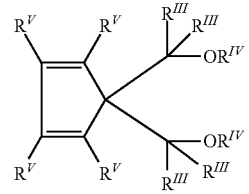

(III)

wherein the radicals $R^{IV}$ have the same meaning explained above and the radicals $R^{III}$ and $R^V$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^V$ and $R^{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Specially preferred are the compounds of formula (IV):

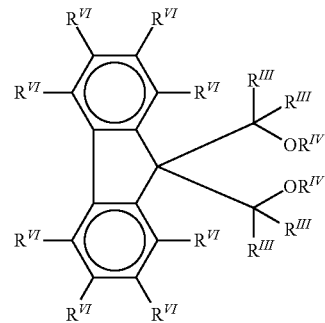

(IV)

wherein the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and x are as defined above for formula (II).

Specific examples of compounds comprised in formulae (II) and (III) are:
1,1-bis(methoxymethyl)-cyclopentadiene;

1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

The molar ratio of first internal donor (succinate) over second internal donor (1,3-diether) 1ID:2ID is comprised between 3:7 and 9:1, preferably between 4.5:5.5 and 8:2.

The succinate is generally present in an amount ranging from 30 to 90% by weight with respect to the total amount of donors. Preferably it ranges from 40 to 85% by weight and more preferably from 50 to 80% by weight. The 1,3-diether preferably constitutes the remaining amount.

As stated above, the catalyst component (a) comprises, in addition to the above electron donors, a titanium compound having at least a Ti-halogen bond and a Mg halide. The magnesium halide is preferably $MgCl_2$ in active form which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n–1 X is halogen and R is a hydrocarbon radical having from 1 to 10 carbon atoms.

Preferably, the catalyst component (a) has an average particle size ranging from 15 to 80 µm, more preferably from 20 to 70 µm and even more preferably from 25 to 65 µm.

The organo-aluminum compound (b) is preferably selected among the trialkyl aluminum compounds such as for example triethylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

The process of the invention is generally carried out at a weight ratio of organo-aluminum compound over propylene lower than 0.020, preferably lower than 0.015, more preferably lower than 0.010 Kg/tonn, the lower limit being preferably 0.001, more preferably 0.003, even more preferably 0.005 Kg/tonn.

Generally, the process of the invention is carried out at a weight ratio of organo-aluminum compound over solid catalyst component (b):(a) of lower than 5.0, preferably lower than 4.0, more preferably lower than 3.0, even more preferably lower than 2.0, the lower limit being preferably 1.0.

When in the process of the invention an external electron donor compound is present, the process is carried out at a weight ratio of organo-aluminum compound over external donor generally lower than 50, preferably lower than 30, more preferably lower than 10.

Preferred external electron-donor compounds (c) include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)_c$, wherein a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1, trifluoropropyl-2-ethylpiperidinyl-dimethoxysilane and 1,1, 1,trifluoropropyl-metil-dimethoxysilane. The external electron donor compound is used in such an amount to give a molar ratio between the organo-aluminum compound and said electron donor compound of from 5 to 500, preferably from 5 to 400 and more preferably from 10 to 200.

The catalyst forming components can be contacted with a liquid inert hydrocarbon solvent such as, e.g., propane, n-hexane or n-heptane, at a temperature below about 60° C. and preferably from about 0 to 30° C. for a time period of from about 6 seconds to 60 minutes.

The above catalyst components (a), (b) and optionally (c) can be fed to a pre-contacting vessel, in amounts such that the weight ratio (b)/(a) is in the range of 0.1-10 and if the compound (c) is present, the weight ratio (b)/(c) is weight ratio corresponding to the molar ratio as defined above. Preferably, the said components are pre-contacted at a temperature of from 10 to 20° C. for 1-30 minutes. The precontact vessel is generally a stirred tank reactor.

Preferably, the precontacted catalyst is then fed to a prepolymerization reactor where a prepolymerization step takes place. The prepolymerization step can be carried out in a first reactor selected from a loop reactor or a continuously stirred tank reactor, and is generally carried out in liquid-phase. The liquid medium comprises liquid alpha-olefin monomer(s), optionally with the addition of an inert hydrocarbon solvent. Said hydrocarbon solvent can be either aromatic, such as toluene, or aliphatic, such as propane, hexane, heptane, isobutane, cyclohexane and 2,2,4-trimethylpentane. The amount of hydrocarbon solvent, if any, is lower than 40% by weight with respect to the total amount of alpha-olefins, preferably lower than 20% by weight. Preferably, step (i)a is carried out in the absence of inert hydrocarbon solvents.

The average residence time in this reactor generally ranges from 2 to 40 minutes, preferably from 10 to 25 minutes. The temperature ranges between 10° C. and 50° C., preferably between 15° C. and 35° C. Adopting these conditions allows obtaining a pre-polymerization degree in the preferred range from 60 to 800 g per gram of solid catalyst component, preferably from 150 to 500 g per gram of solid catalyst component. Step (i)a is further characterized by a low concentration of solid in the slurry, typically in the range from 50 g to 300 g of solid per liter of slurry.

The slurry containing the catalyst, preferably in pre-polymerized form, is discharged from the pre-polymerization reactor and fed to a gas-phase or liquid-phase polymerization reactor. In case of a gas-phase reactor, it generally consists of a fluidized or stirred, fixed bed reactor or a reactor comprising two interconnected polymerization zones one of which, working under fast fluidization conditions and the other in which the polymer flows under the action of gravity. The liquid phase process can be either in slurry, solution or bulk (liquid monomer). This latter technology is preferred and can be carried out in various types of reactors such as continuous stirred tank reactors, loop reactors or plug-flow ones.

The polymerization is carried out at temperature equal or higher than 78° C., preferably of from 78 to 90° C., more preferably of from 80 to 85° C.

The average residence time in the polymerization reactor is generally higher than 60 minutes, preferably higher than 80 minutes, more preferably higher than 100 minutes.

When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Preferably, the polymerization step is carried out by polymerizing propylene in liquid monomer, more preferably in loop reactor, to give the required propylene polymer.

In this stage, hydrogen can be used as a molecular weight regulator.

The thus obtained propylene polymers, that represent another object of the invention, show very low amounts of ashes, particularly of magnesium and chlorine.

The magnesium content is generally lower than 4 ppm, preferably lower than 3 ppm and more preferably lower than 2 ppm.

The chlorine content is generally lower than 10 ppm, preferably lower than 7.5 ppm and more preferably lower than 5 ppm.

The titanium content is generally lower than 2 ppm, preferably lower than 1.5 ppm and more preferably lower than 1 ppm.

The aluminum content is generally lower than 10 ppm, preferably lower than 5 ppm and more preferably lower than 3 ppm.

The propylene polymers of the invention have a total ash content generally lower than 40 ppm, preferably lower than 30 ppm and more preferably lower than 20 ppm.

The propylene polymers of the invention can be crystalline propylene homo- or copolymers containing up to 10% of comonomer such as ethylene, butene-1 and/or hexene-1. Preferred are the propylene homopolymers.

Beside the high purity, the propylene polymers of the invention show low amounts of xylene solubles. Particularly, when an external electron donor (c) is used, the content of xylene solubles is generally lower than 2.5 wt %, preferably lower than 2.2 wt % and more preferably 2.0 wt % or even lower.

The propylene polymers of the invention show a medium/broad molecular weight distribution expressed by a rheological polydispersity index (PI) generally higher than 3.5, preferably higher than 4, as well as by Mw/Mn values generally higher than 6.0, preferably higher than 6.5.

The propylene polymers of the invention show a high isotacticity, as reflected by the content of mmmm pentads that is generally higher than 98.0%.

The propylene polymers of the invention can also contain additives commonly employed in the art, such as antioxidants, light stabilizers, heat stabilizers, nucleating agents, colorants and fillers. The high purity propylene polymers of the invention can suitably be used for the preparation of extruded articles, particularly films, which represent a further object of the invention.

Films obtained with the high purity propylene polymers of the invention, particularly bioriented films (BOPP), can suitably be used for dielectric capacitors.

Another field of application for the films obtained with the high purity propylene polymers of the invention is that of very thin films for print lamination, cigarette packing. Such films have a thickness generally lower than 15 micron, typically in the range of 9-12 micron.

The following examples are given to illustrate the present invention without any limiting purpose.

EXAMPLES

Methods

The characterization data for the propylene polymers were obtained according to the following methods:

Melt Flow Rate (MFR)

Determined according to ISO 1133 (230° C., 2.16 Kg).

Xylene Solubles (XS)

Determined as follows: 2.5 g of polymer and 250 ml of xylene are introduced in a glass flask equipped with a refrigerator and a magnetical stirrer. The temperature is raised in 30 minutes up t the boiling pint of the solvent. The so obtained clear solution is then kept under reflux and stirring for further 30 minutes. The closed flask is then kept in thermostatic water bath at 25° C. for 30 minutes. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Polydispersity Index (PI)

Determined according to ISO 6721-10 method. PI is calculated by way of a dynamic test carried out with a RMS-800 rheometric mechanical spectrometer. The PI is defined by the equation $$PI=10^5/Gc,$$

where the Gc (crossover modulus) value is the one where G' (storage modulus) coincides with G" (loss modulus). A sample is prepared with one gram of polymer, said sample having a thickness of 3 mm and a diameter of 25 mm; it is then placed in the above mentioned apparatus and the temperature is then gradually increased until it reaches a temperature of 200 C after 90 minutes. At this temperature one carries out the test where G' and G" are measured in function of the frequency.

Molecular Weight ($\overline{M}_n$, $\overline{M}_w$)

Measured by way of gel permeation chromatography (GPC) in 1,2,4-trichlorobenzene.

Determination of Isotactic Pentads Content

Determined as follows: 40 mg of each xylene insoluble fraction were dissolved in 0.5 mL of $C_2D_2Cl_4$. The $^{13}C$ NMR spectra were acquired on a Bruker AV-600 (150.61 Mhz, 90° pulse, 15 s delay between pulses) at 120° C. About 1500 transients were stored for each spectrum; mmmm pentad peak (21.8 ppm) was used as reference. The microstructure analysis was carried out as described in literature (Polymer, 1984, 25, 1640, by Inoue Y. et Al. and Polymer, 1994, 35, 339, by Chujo R. et Al.).

Content of Mg, Ti and Al

Determined via inductively coupled plasma emission spectroscopy (ICP) on a "I.C.P SPECTROMETER ARL Accuris". The portion of polymer used for the analysis is homogenized through a sample divider. The sample is prepared by weighting in a platinum crucible ~10 g of polymer and 0.5 g of potassium sulphate. The crucible is placed on a Bunsen flame and burning is started avoiding losses due to molten polymer spillage. When the combustion of the polymer is over, carbon residuals are eliminated from the crucible using a muffle at a temperature of 800° C. The crucible is then cooled to room temperature, 2.5 ml of H2SO4 are added and the crucible walls are washed with 1-5 ml of fluoridric acid. The crucible is very gently warmed to eliminate any vapours of HF and of SiF4. As soon as sulphuric fumes start being detected, warming of the crucible is stopped and the crucible is let cooling to room temperature. The solution is then transferred in a 50 ml calibrated flask filling up to total volume with demineralised water. The thus obtained solution is analyzed via ICP at the following wavelengths:

Aluminum 308, 22 nm,
Magnesium 280, 27 nm,
Titanium 334, 94 nm.

Content of Cl

The polymer is treated with a volume of an alcoholic potassium hydroxide solution sufficient to cover the sample. The alcohol is slowly evaporated on a hot plate. The polymer is then thermally decomposed on a Bunsen flame. Carbonaceous residues are removed at 500° C. The residue is solubilized in $HNO_3$. The concentration of chlorine is determined by potentiometric tritration with $AgNO_3$.

Content of Total Ash

Determined according to method ISO 3451, method A, by using a Bunsen flame for burning the polymer.

Example 1 and Comparative Examples 1-2

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2.2.1C_2H_5OH$ having average particle size of 47 μm (prepared in accordance with the method described in example 1 of EP728769, an amount of diethyl 2,3-diisopropylsuccinate such as to have a Mg/succinate molar ratio of 12 was added. The temperature was raised to 100° C. and kept at this value for 60 min. After that the stirring was stopped, the liquid was siphoned off After siphoning, fresh $TiCl_4$ and an amount of 9,9-bis (methoxymethyl)fluorene (1,3-diether) such as to have a Mg/1,3-diether molar ratio of 24 were added. Then the temperature was raised to 110° C. and kept for 30 minutes under stirring. After sedimentation and siphoning at 100° C., fresh TiCl4 was added. Then the temperature was raised to 90° C. for 15 min. After sedimentation and siphoning at 90° C. the solid was washed six times with anhydrous hexane (6×100 ml) at 60° C.

Preparation of the Catalyst System

Before introducing it into the polymerization reactors, the solid catalyst component described above is contacted with aluminum-triethyl (TEAL) with dicyclopentyl-dimethoxysilane (DCPMS) at a temperature of 15° C. under the conditions reported in Table 1.

Prepolymerization

The catalyst system is then subject to prepolymerization treatment at 20° C. by maintaining it in suspension in liquid propylene before introducing it into the polymerization reactor.

Polymerization

The polymerization was carried out in continuous mode in a liquid phase loop reactor. The polymerization reactor was. Hydrogen was used as molecular weight regulator.

The main polymerization conditions are reported in Table 1. The analytical data relating to the polymers produced are reported in Table 2.

The values for aluminum, magnesium and chlorine in the table, are the calculated values, based on the amount of polymer that was produced, the composition of the solid catalyst component, and the amount of aluminum alkyl used in polymerization.

It results that, by the process of the invention it is possible to obtain propylene polymers polymers having a very low content of ashes, particularly in terms of Mg and Cl.

TABLE 1

Polymerization conditions

| | | Ex. 1 | Comp. Ex. 1 | Comp. Ex. 12 |
|---|---|---|---|---|
| TEAL/catalyst | Wt ratio | 1.3 | 1.5 | 4.6 |
| TEAL/DCPMS | Wt ratio | 8 | 19 | 33 |
| DCPMS/catalyst | Wt ratio | 0.158 | 0.08 | 0.138 |
| TEAL/C3− | Wt ratio | 0.007 | 0.012 | 0.027 |
| Prepoly. residence time | min | 12.5 | 8.5 | 12.5 |
| Temperature | ° C. | 80 | 75 | 80 |
| Residence time | min | 123 | 114 | 125 |
| H2 fed conc | mol ppm | 974 | 1116 | 992 |
| Mileage | Kg/g | 94 | 77 | 119 |

TABLE 2

Polymer characteristics

| | | Ex. 1 | Comp. Ex. 1 | Comp. Ex. 2 |
|---|---|---|---|---|
| MFR | g/10' | 2.3 | 2.2 | 1.8 |
| XS | wt % | 2 | 2.5 | 2 |
| PI | | 4.8 | 5.4 | 4.9 |
| Mw/Mn | | 7 | 7.3 | 6.4 |
| mmmm | % | 98.5 | 98.3 | 98.5 |
| Al | ppm | 2 | 3.8 | 10 |
| Cl | ppm | 4 | 6.2 | 6 |

TABLE 2-continued

Polymer characteristics

|  |  | Ex. 1 | Comp. Ex. 1 | Comp. Ex. 2 |
|---|---|---|---|---|
| Mg | ppm | 1.3 | 2.3 | 1.9 |
| Ti | ppm | 0.8 | 1 | 1 |
| Total ash | ppm | 16 | 18 | 29 |

What is claimed is:

1. A low ash process for the preparation of a high purity propylene copolymer comprising copolymerizing propylene in the presence of a catalyst system comprising:
   (a) a solid catalyst component comprising Mg, Ti, a first internal electron donor compound (1ID) comprising a succinate and a second internal electron donor compound (2ID) comprising a 1,3-diether, wherein the molar ratio of the first internal donor compound and the second internal donor compound 1ID:2ID is from 4:6-9:1 and the solid catalyst component comprising an average particle size of 25-65 µm; and
   (b) an organo-aluminum compound;
   wherein the process is carried out at a temperature equal to or higher than 78° C. with a weight ratio of organo-aluminum compound to propylene from 0.005-0.020 kg/ton, and wherein the propylene copolymer comprises an $M_w/M_n$ greater than 6.0, a rheological polydispersity index (PI) greater than 3.5, an isotacticity greater than 98.0%, a Mg content lower than 2 ppm, a Cl content lower than 5 ppm, a Ti content lower than 1 ppm, and an Al content lower than 3 ppm.

2. The process according to claim 1, wherein the succinate for use as internal electron donor compound 1ID is selected from those belonging to the following formula (I):

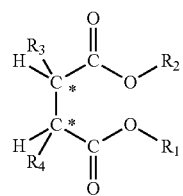

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, $C_3$-$C_{20}$ cycloalkyl, $C_5$-$C_{20}$ aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S).

3. The process according to claim 1, wherein the 1,3-diether for use as internal electron donor compound 2ID is selected from those belonging to the following formula (II):

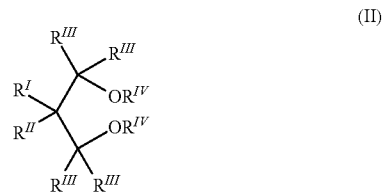

wherein $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S or Si.

4. The process according to claim 1, wherein the organo-aluminum compound (b) is selected from trialkyl aluminum compounds.

5. The process according to claim 1, wherein a weight ratio of organo-aluminum compound to solid catalyst component (b):(a) is lower than 5.0.

6. The process of claim 1, further comprising contacting the solid catalyst component with an external electron donor compound.

7. The process according to claim 6, wherein the external electron donor compound (c) is selected among the silicon compounds of formula $R_a^5 R_b^6 Si(OR^7)_c$, wherein a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms.

8. The process according to claim 1, wherein the propylene copolymer comprises an ash content lower than 40 ppm.

9. The process of claim 1, wherein the propylene copolymer comprises an $M_w/M_n$ greater than 6.5.

10. The process of claim 1, wherein the propylene copolymer comprises a rheological polydispersity index (PI) greater than 4.

11. The process according to claim 1, wherein the process includes a step of forming a film comprising the high purity propylene copolymer.

* * * * *

UNITED STATES PATENT AND TRADEMARK OFFICE
CERTIFICATE OF CORRECTION

PATENT NO. : 10,221,261 B2
APPLICATION NO. : 14/346648
DATED : March 5, 2019
INVENTOR(S) : Galvan et al.

It is certified that error appears in the above-identified patent and that said Letters Patent is hereby corrected as shown below:

In the Specification
In Column 1, Line 31, delete "cristallinity" and insert -- crystallinity --, therefor
In Column 1, Line 52, delete "cristallinity" and insert -- crystallinity --, therefor
In Column 2, Line 54, delete "cycloakyls" and insert -- cycloalkyl --, therefor
In Column 8, Line 51, delete "t" and insert -- to --, therefor
In Column 8, Line 51, delete "pint" and insert -- point --, therefor
In Column 9, Line 54, delete "tritration" and insert -- titration --, therefor
In Column 10, Line 25, after "was" delete ".", therefor
In Column 10, Line 37, after "propylene polymers" delete "polymers"

Signed and Sealed this
Twenty-eighth Day of June, 2022

Katherine Kelly Vidal
*Director of the United States Patent and Trademark Office*